US012807055B2

(12) United States Patent
Zimmerman et al.

(10) Patent No.: US 12,807,055 B2
(45) Date of Patent: Nov. 24, 2026

(54) HANDRAIL ASSEMBLY FOR TAILGATE

(71) Applicant: Ford Global Technologies, LLC, Dearborn, MI (US)

(72) Inventors: Jon Arthur Zimmerman, Ferndale, MI (US); William Charles Brick, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 18/738,141

(22) Filed: Jun. 10, 2024

(65) Prior Publication Data

US 2025/0376099 A1 Dec. 11, 2025

(51) Int. Cl.
*B60R 3/02* (2006.01)
*B60N 3/02* (2006.01)

(52) U.S. Cl.
CPC ................ *B60N 3/023* (2013.01); *B60R 3/02* (2013.01)

(58) Field of Classification Search
CPC .......... B60R 3/02; B60R 13/105; B60N 3/023
USPC ........................................................ 280/163
See application file for complete search history.

(56) References Cited

U.S. PATENT DOCUMENTS 4,216,725 A 8/1980 Hallam
5,028,063 A * 7/1991 Andrews .................. B60R 3/02 280/166
5,205,603 A * 4/1993 Burdette, Jr. ............. B60R 3/02 182/195
6,942,271 B1 9/2005 Jamison et al.
7,516,997 B2 4/2009 Kuznarik et al.
7,673,922 B1 * 3/2010 Grimes ..................... B60R 3/02 280/166
7,712,811 B2 * 5/2010 Heaman ............. B62D 33/0273 296/62
8,893,853 B2 * 11/2014 Kennedy ................. B60R 3/002 182/95
8,919,853 B2 * 12/2014 Krishnan .................. B60R 3/02 296/62
8,985,660 B1 * 3/2015 Weber ..................... B60R 3/005 296/62
9,022,405 B2 5/2015 Kibler
9,302,719 B1 * 4/2016 Krishnan .................. B60R 3/02
9,623,915 B2 * 4/2017 Worden ............. B62D 33/0273
9,994,263 B1 * 6/2018 Richter ................... B60P 1/435
11,780,373 B2 * 10/2023 Salter ..................... B62D 33/03 296/62
12,030,416 B2 * 7/2024 Spencer ................. B60N 3/023
12,172,603 B2 * 12/2024 Salter ......................... E06C 5/18
12,202,437 B2 * 1/2025 Glickman ................. B60R 3/02
12,233,818 B2 * 2/2025 Kapur ....................... B60R 3/02
(Continued)

OTHER PUBLICATIONS

Amazon.com: Hatchlift Products. Amazon. (n.d.). https://www.amazon.com/stores/HatchliftProducts/Homepage/page/F13751F0-73BF-419F-971D-18E85E8B0934.

*Primary Examiner* — James A Shriver, II
*Assistant Examiner* — Hilary L Johns
(74) *Attorney, Agent, or Firm* — Vichit Chea; Carlson, Gaskey & Olds, P.C.

(57) ABSTRACT

A motor vehicle may include a tailgate. A motor vehicle may include a handrail assembly moveable relative to the tailgate between a stowed position and a deployed position, wherein the handrail assembly includes a housing and a handrail attached to the housing, wherein, when the handrail assembly is in the deployed position, the handrail is inclined relative to the housing.

20 Claims, 10 Drawing Sheets

(56) References Cited

U.S. PATENT DOCUMENTS

| | | | | |
|---|---|---|---|---|
| 2007/0096422 | A1 | 5/2007 | Dolan | |
| 2010/0019468 | A1* | 1/2010 | Price | B60R 3/007 280/165 |
| 2012/0312825 | A1* | 12/2012 | Kennedy | B60R 3/02 220/660 |
| 2015/0336622 | A1* | 11/2015 | Worden | E05D 11/1014 296/50 |
| 2022/0332253 | A1* | 10/2022 | Mcleod | B60R 3/02 |
| 2023/0022503 | A1* | 1/2023 | Spencer | B60N 3/023 |
| 2023/0114575 | A1* | 4/2023 | Kapur | B60R 3/02 280/163 |
| 2023/0303002 | A1* | 9/2023 | Kane | B60R 3/02 |
| 2023/0373398 | A1* | 11/2023 | Bird | B60R 3/02 |

* cited by examiner

HANDRAIL ASSEMBLY FOR TAILGATE

TECHNICAL FIELD

This disclosure relates to a handrail assembly for a tailgate of a motor vehicle.

BACKGROUND

Some vehicles, such as pickup trucks, include a cargo bed. The cargo bed can be located behind a passenger compartment of the vehicle. A tailgate can enclose a rear, or aft, end of the cargo bed. Users use cargo beds to carry various types of loads and/or cargo.

SUMMARY

In some aspects, the techniques described herein relate to a motor vehicle, including; a tailgate; and a handrail assembly moveable relative to the tailgate between a stowed position and a deployed position, wherein the handrail assembly includes a housing and a handrail attached to the housing, wherein, when the handrail assembly is in the deployed position, the handrail is inclined relative to the housing.

In some aspects, the techniques described herein relate to a motor vehicle, wherein: the handrail assembly includes a linkage assembly, and the handrail is moveably connected to the housing via the linkage assembly.

In some aspects, the techniques described herein relate to a motor vehicle, wherein: the handrail assembly is moveable from the stowed position to an intermediate position in which the housing and handrail have been rotated relative to the stowed position, and in which the handrail is in a retracted position relative to the housing, and the linkage is configured to cause the handrail to move relative to the housing in a vertical direction and a direction perpendicular to the vertical direction, simultaneously, to move the handrail out of the retracted position and such that the handrail assembly is in the deployed position.

In some aspects, the techniques described herein relate to a motor vehicle, wherein: when the handrail assembly is in the intermediate position, the handrail is substantially parallel to the housing, and when the handrail assembly is in the deployed position, the handrail is non-parallel and non-perpendicular relative to the housing.

In some aspects, the techniques described herein relate to a motor vehicle, further including a lock assembly configured to selectively hold the handrail assembly in the deployed position unless actuated.

In some aspects, the techniques described herein relate to a motor vehicle, wherein: the lock assembly includes a push-rod and a latch, the lock assembly is configured such that the push-rod is biased by a spring such that a portion of the latch is within a slot when the handrail assembly is in the deployed position, and the lock assembly is configured such that sliding of the push-rod overcoming the bias of the spring brings the latch out of the slot such that the handrail can be moved relative to the housing to the retracted position.

In some aspects, the techniques described herein relate to a motor vehicle, wherein: the lock assembly includes a knob coupled to a latch, the lock assembly is configured such that the knob is biased by a spring such that a portion of the latch is within a slot when the handrail assembly is in the deployed position, and the lock assembly is configured such that rotation of the knob overcoming the bias of the spring brings the latch out of the slot such that the handrail can be moved relative to the housing to the retracted position.

In some aspects, the techniques described herein relate to a motor vehicle, wherein: the lock assembly includes a push-pull cable coupled to a slider mounted in the handrail, the lock assembly further includes a cam coupled to the push-pull cable on an opposite side of the slider, the lock assembly includes a pin configured to selectively hold the linkage assembly in place when the handrail assembly is in the deployed position, and the cam is selectively rotatable into engagement with the pin to cause the pin to disengage the linkage assembly such that the handrail can be moved relative to the housing to the retracted position.

In some aspects, the techniques described herein relate to a motor vehicle, wherein the handrail is in the retracted position relative to the housing when the handrail assembly is in the stowed and intermediate positions.

In some aspects, the techniques described herein relate to a motor vehicle, wherein the linkage assembly is configured to cause the handrail to move vertically upward and rearward when moving from the retracted position to the deployed position of the handrail assembly.

In some aspects, the techniques described herein relate to a motor vehicle, wherein: the linkage assembly includes a first link and a second link, the first link is pivotably joined to the housing adjacent a first end thereof and is pivotably joined to the handrail adjacent a second end thereof opposite the first end of the first link, and the second link is pivotably joined to the housing adjacent a first end thereof and is pivotably joined to the handrail adjacent a second end thereof opposite the first end of the second link.

In some aspects, the techniques described herein relate to a motor vehicle, wherein: the first end of the first link is spaced-apart from the first end of the second link along a length of the housing, and the second end of the first link is spaced-apart from the second end of the second link along a length of the handrail.

In some aspects, the techniques described herein relate to a motor vehicle, wherein the handrail includes a concave surface facing the housing.

In some aspects, the techniques described herein relate to a motor vehicle, wherein at least a portion of the housing is nested within the handrail when the handrail is in the retracted position.

In some aspects, the techniques described herein relate to a motor vehicle, wherein, when the handrail assembly is in the stowed position, the handrail assembly is within an inner cavity of the tailgate.

In some aspects, the techniques described herein relate to a motor vehicle, further including: a step assembly movable between a stowed position and a deployed position relative to an inner cavity of the tailgate, wherein the step assembly includes a first step pad and a second step pad, and wherein, when the step assembly is in the deployed position, the first step pad is spaced-apart vertically from the second step pad.

In some aspects, the techniques described herein relate to a method, including: moving a handrail assembly relative to a tailgate of a motor vehicle between a stowed position and a deployed position, wherein the handrail assembly includes a housing and a handrail attached to the housing, wherein, when the handrail assembly is in the deployed position, the handrail is inclined relative to the housing.

In some aspects, the techniques described herein relate to a method, wherein the step of moving the handrail assembly includes: moving the handrail assembly from the stowed position to an intermediate position in which the housing and handrail have been rotated relative to the stowed position, and in which the handrail is in a retracted position relative to the housing, moving the handrail relative to the housing by simultaneously moving the handrail relative to the housing in a vertical direction and in a direction perpendicular to the vertical direction to move the handrail out of the retracted position and such that the handrail assembly is in the deployed position.

In some aspects, the techniques described herein relate to a method, further including actuating a lock assembly before moving the handrail assembly from the deployed position.

In some aspects, the techniques described herein relate to a method, further including: deploying a step assembly relative to the tailgate, wherein the step assembly includes a first step pad and a second step pad spaced-apart from the first step pad.

DETAILED DESCRIPTION

This disclosure relates to a handrail assembly for a tailgate of a motor vehicle. This disclosure provides a handrail which is both convenient to use and ergonomic, providing support to a user throughout an entire path of travel into or out of a tailgate of the vehicle, for example, including with respect to tailgates that are fit with step assemblies having more than one step. Further, the handrail assembly provides a sense of familiarity to users, as most users are comfortable using handrails when they climb traditional stairs. The handrail assembly of this disclosure is also readily manufactured and assembled. These and other benefits will be appreciated from the following description.

Figure 1:
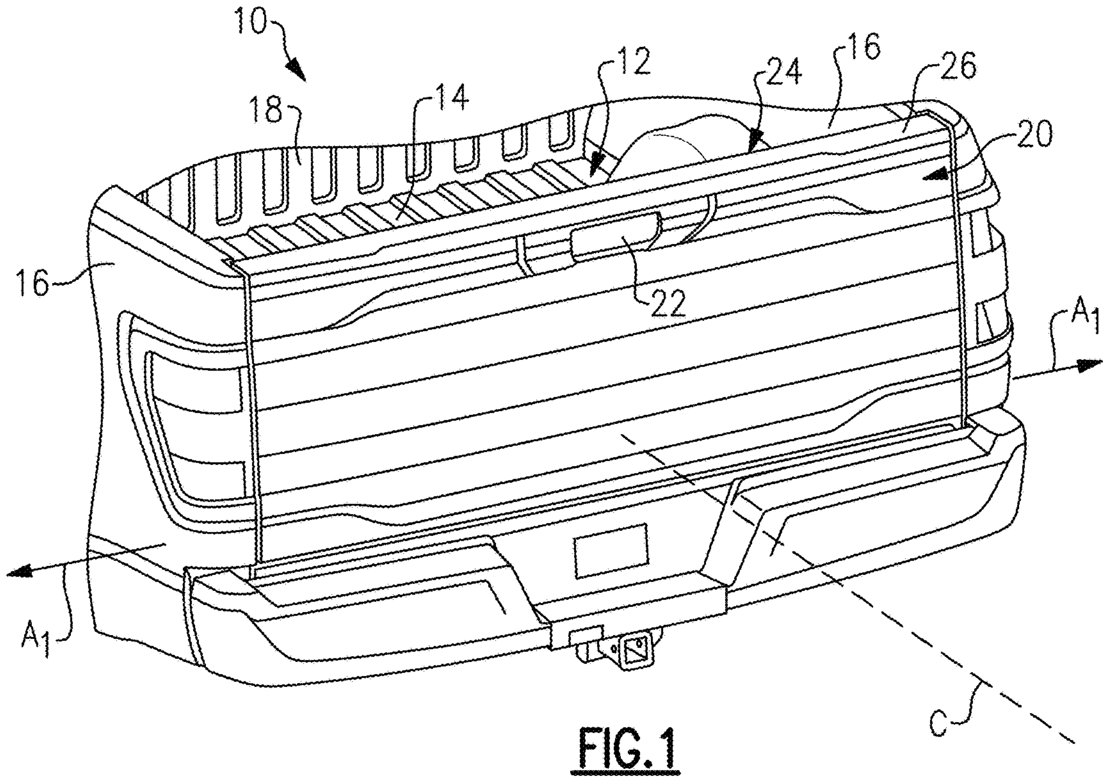
FIG. 1 is a rear perspective view of a portion of an example motor vehicle with a tailgate in a closed position.

Referring to the drawings, FIG. 1 is a front perspective view of an example motor vehicle 10, which in this example is a pickup truck. While a pickup truck is shown, this disclosure extends to other vehicle types.

In this disclosure, the motor vehicle 10 includes a cargo space for storing and/or hauling one or more items of cargo. In the illustrated embodiment, the cargo space is established by a cargo bed 12 of the pickup truck. While a pickup truck with a cargo bed is specifically depicted and referenced herein, other vehicles having other types of cargo spaces could also benefit from the teachings of this disclosure. The motor vehicle 10 could also be an internal combustion engine powered vehicle, a traction battery powered electric or hybrid vehicle, an autonomous vehicle (i.e., a driverless vehicle), etc.

The cargo bed 12 is generally rearward of a passenger cabin (not shown) of the vehicle 10 and includes a floor 14 extending between a pair of longitudinally extending side walls 16, a laterally extending front wall 18, and a tailgate 20. The tailgate 20 may be referred to as a tailgate assembly. The overall size, shape, and configuration of the cargo bed 12 is not intended to limit this disclosure.

Figure 2:
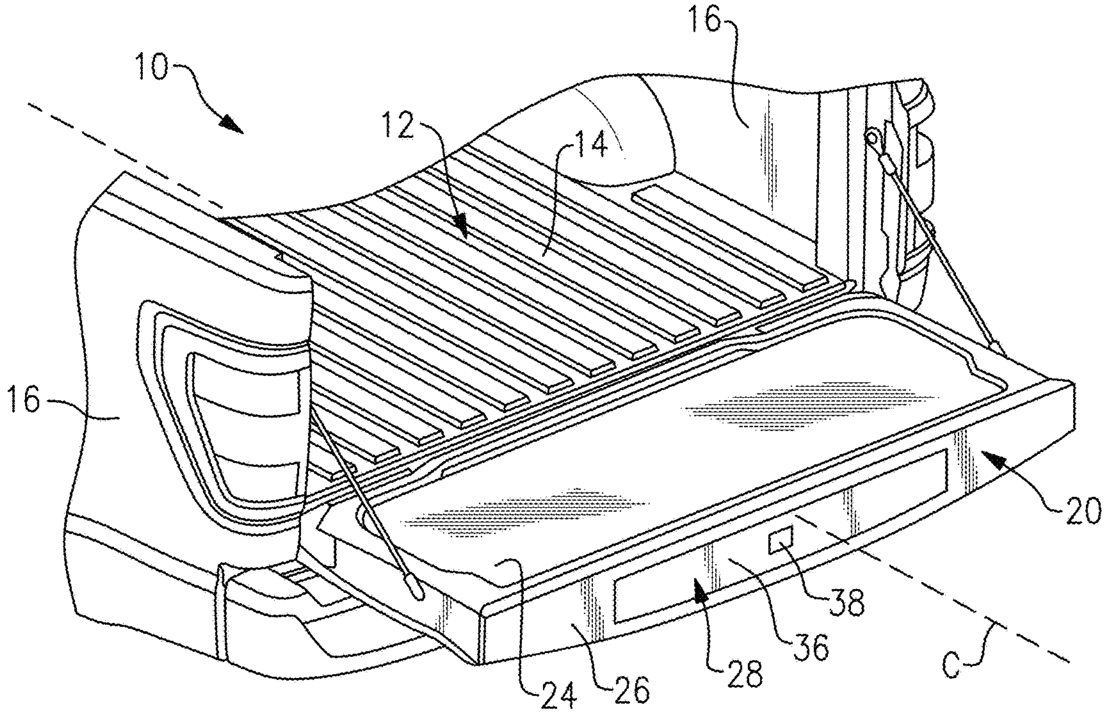
FIG. 2 is a view similar to FIG. 1 with the tailgate in an open position.

The tailgate 20 is pivotable about a first axis A1 relative to the cargo bed 12 between a closed position shown in FIG. 1 and an open position shown in FIG. 2. The first axis A1 is substantially perpendicular to a centerline C of the motor vehicle 10.

The tailgate 20 may be moved from the closed position to the open position in response to actuating a handle 22 of the tailgate 20, for example. In the closed position, the tailgate 20 encloses an end of the cargo bed 12 that is opposite from the front wall 18. In the open position, the tailgate 20 is rotated substantially 90° relative to the closed position, and allows access to the cargo bed 12 from the rear.

The tailgate 20, in this disclosure, includes a plurality of panels connected to provide the overall structure of the tailgate 20. Within the panels, the tailgate includes an inner cavity. Among other panels, the tailgate 20 includes a panel 24 and a panel 26. When the tailgate 20 is in the closed position, the panel 24 provides a front-facing surface of the tailgate 20, and when the tailgate 20 is in the open position, the panel 24 provides an upper surface of the tailgate 20, which can be used as a work surface, for example. When the tailgate 20 is in the closed position, the panel 26 provides an upper surface of the tailgate 20, and when the tailgate is in the open position, the panel 26 provides a rear-facing surface of the tailgate 20.

A user may require assistance for stepping up and accessing the cargo bed 12 from the ground. This disclosure includes a deployable step assembly 28. The step assembly 28 is movable between a stowed position (FIG. 2) and a deployed position (FIG. 3) relative to an inner cavity 30 of the tailgate 20. The inner cavity 30 is a space within the tailgate 20 and is enclosed by the panels of the tailgate 20. Specifically, panels 24 and 26 partially enclose the inner cavity 30.

This disclosure also includes a deployable handrail assembly 32 movable between a stowed position (FIG. 2) and a deployed position (FIG. 3) relative to the inner cavity 30. When the handrail assembly 32 is in the stowed position, the entire handrail assembly 32 is within an inner cavity 30, in this example.

When moving from the stowed position to the deployed position, the step assembly 28 moves generally rearwardly and downwardly. The handrail assembly 32 moves generally rearwardly and upwardly, in this example, when moving from the stowed position to the deployed position. When in the deployed position, the handrail assembly 32 is in a location such that a portion of the handrail assembly 32 is able to be grasped by a hand of a user while the user is using the step assembly 28 to enter or exit the cargo bed 12. The handrail assembly 32 may be considered part of the step assembly 28.

Figure 3:
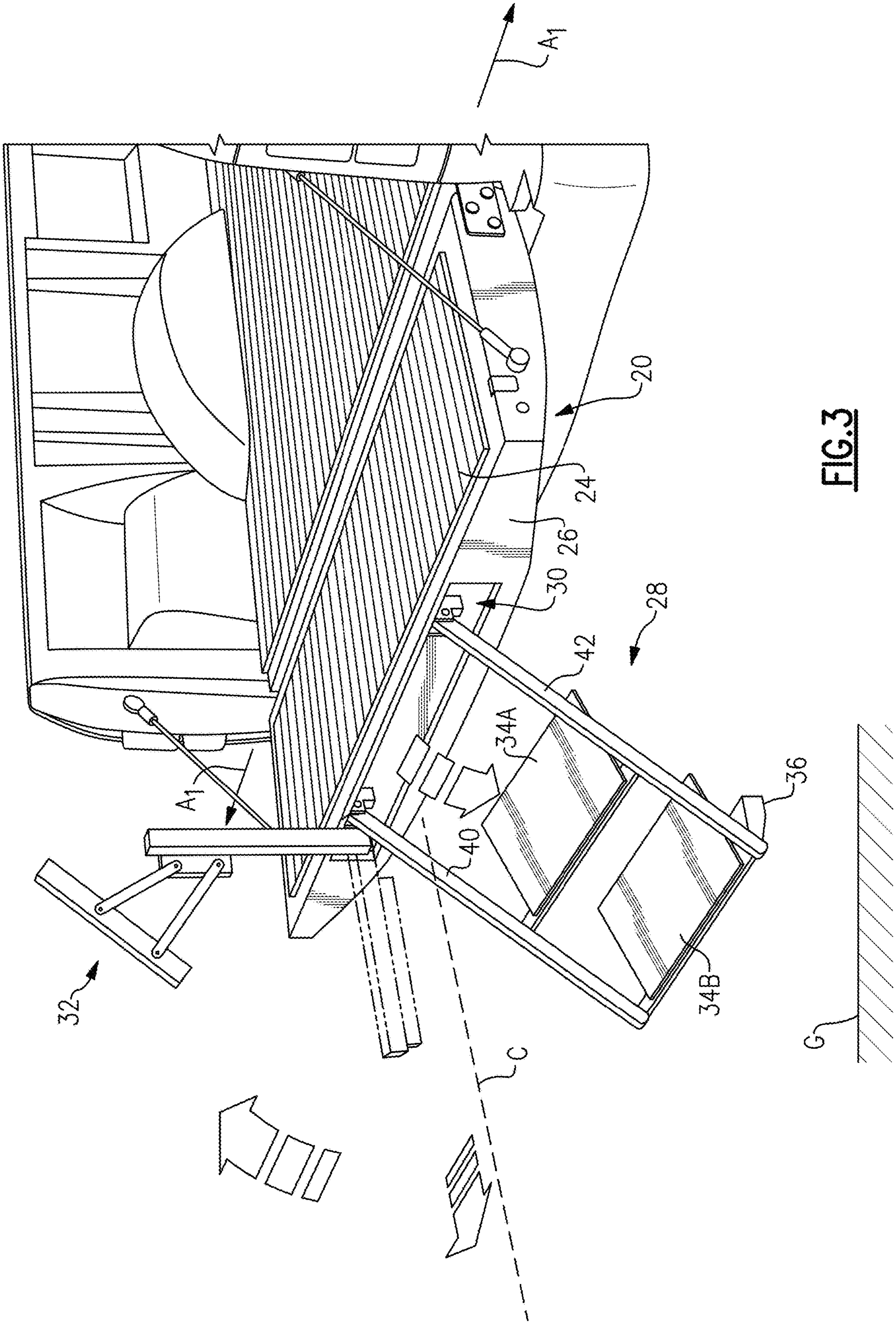
FIG. 3 is a view of the tailgate in the open position, a step assembly, and a handrail assembly.

With reference to FIG. 3, the step assembly 28 includes a first step pad 34A and a second step pad 34B. The first and second step pad 34A, 34B are both configured to support a foot, or feet, of a user from below. When the step assembly 28 is in the deployed position, the first step pad 34A and second step pad 34B are spaced-apart from one another in a vertical direction (i.e., generally, the up-and-down direction, relative to a ground surface G adjacent the vehicle 10). The first step pad 34A is vertically below the panel 24. The second step pad 34B is vertically above the ground surface G. Further, the second step pad 34B is spaced-apart rearwardly, in a direction parallel to centerline C, from the first step pad 34A.

The second step pad 34B is connected to a cover 36, in this example, which extends in a direction substantially perpendicular to a centerline C of the motor vehicle 10. The cover 36 is configured to sit flush with the panel 26 and enclose the inner cavity 30 when the step assembly 28 is in the stowed position. Alternatively, the cover 36 may be provided by another structure. A button 38 may be configured to selectively release the step assembly 28 from the stowed position.

The cover 36 is connected to first and second rails 40, 42. When the step assembly 28 is in the deployed position, the first and second rails 40, 42 are configured to support the cover 36 and first and second step pads 34A, 34B. The first and second rails 40, 42 are slidable and pivotable relative to the tailgate 20.

Figure 4:
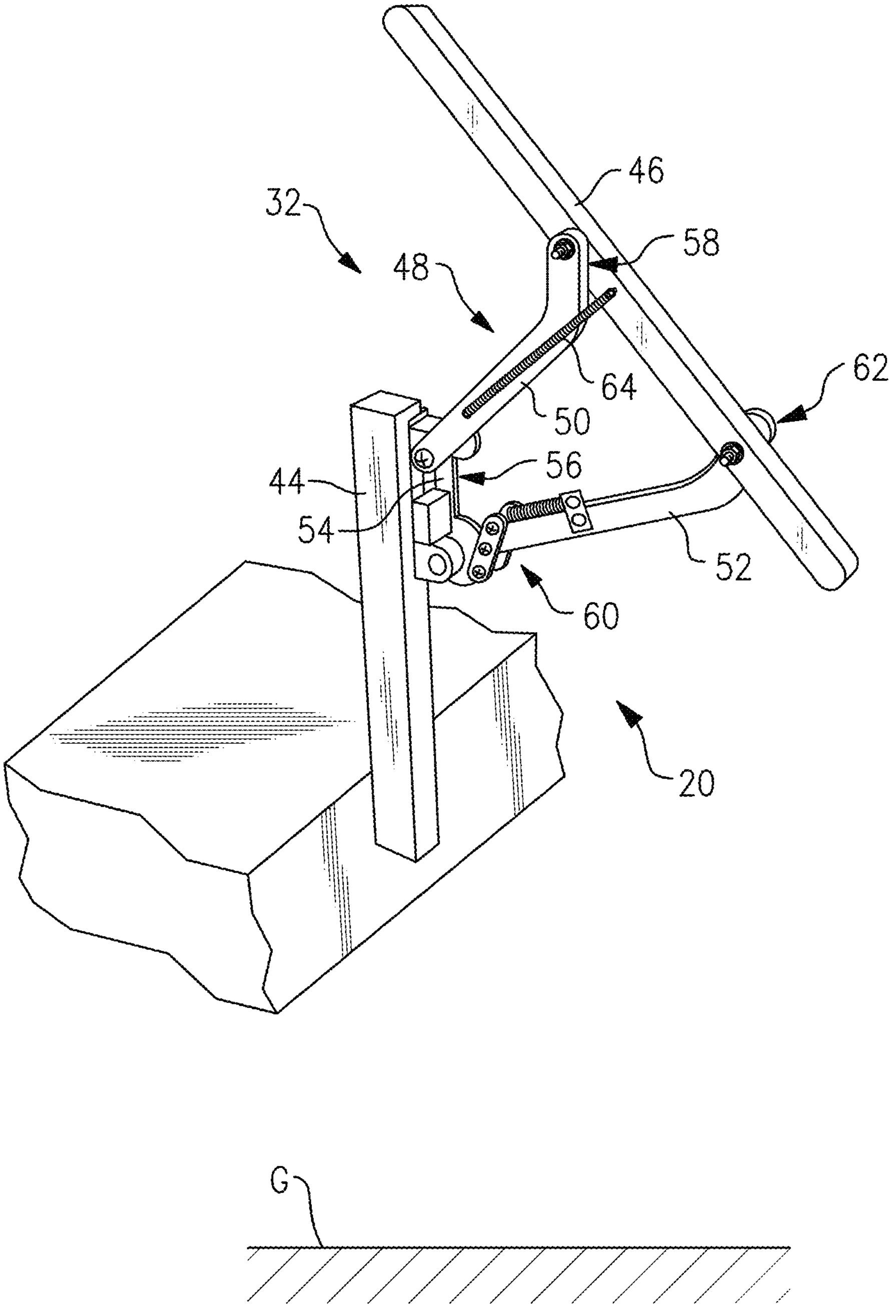
FIG. 4 is a side perspective view of the handrail assembly in a deployed position.

FIG. 4 illustrates the handrail assembly 32 in the deployed position. The handrail assembly 32 includes a housing 44 and a handrail 46. The housing 44, in this example, is provided by a substantially rectangular tube. The housing 44 could be arranged differently, however. The handrail 46 is moveably connected to the housing 44 via a linkage assembly 48. The linkage assembly 48 facilitates movement of the handrail 46 between a retracted position (FIG. 5) and the deployed position (FIG. 4).

In this example, the linkage assembly 48 includes a first link 50 and a second link 52. The first link 50 is pivotably joined to the housing 44, via a bracket 54 rigidly attached to the housing 44, adjacent a first end 56 thereof and is pivotably joined to the handrail 46 adjacent a second end 58 thereof opposite the first end 56 of the first link 50. The second link 52 is pivotably joined to the housing 44, via the bracket 54, adjacent a first end 60 thereof and is pivotably joined to the handrail 46 adjacent a second end 62 thereof opposite the first end 60 of the second link 52. The pivot joints adjacent the ends of the first and second links 50, 52 are configured to permit free rotation about the pivot joints. The first end 56 of the first link 50 is spaced-apart from the first end 60 of the second link 52 along a length of the housing 44 (and, in this case, the bracket 54), and the second end 58 of the first link 50 is spaced-apart from the second end 62 of the second link 52 along a length of the handrail 46.

The housing 44 (via the bracket 54), the handrail 46, the first link 50, and the second link 52 together essentially provide a four bar linkage, in this example. The first and second links 50, 52 may include curved portions, such as the curved portions adjacent respective second ends 58, 62 (as in this example), or may be substantially straight along an entire length thereof. Further, while a bracket 54 is attached to the housing 44 in this example, the bracket 54 is not required, and the first and second links 50, 52 could be pivotably joined directly to the housing 44 in other examples.

Figure 5:
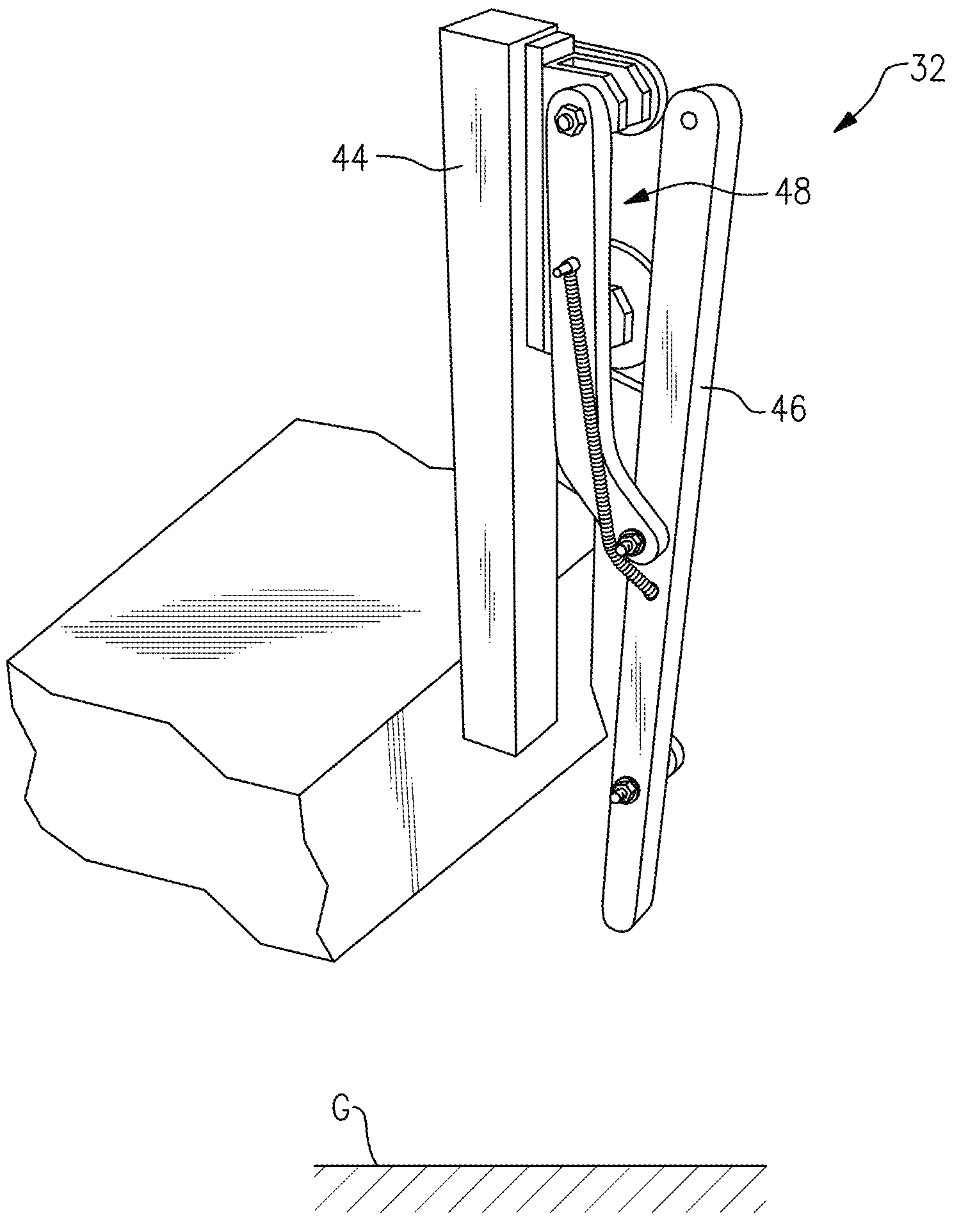
FIG. 5 is a side perspective view of the handrail assembly in an intermediate position.

In FIG. 5, the handrail assembly 32 is in an intermediate position, which is a position of the handrail assembly 32 between the stowed position and the deployed position. In the intermediate position, the handrail assembly 32 is configured such that the handrail 46 is in a retracted position. In the retracted position, the handrail 46 is substantially parallel to the housing 44. Specifically, a length dimension of the handrail 46 extends in a direction substantially parallel to a direction at which a length dimension of the housing 44 extends, which in this example is substantially perpendicular to the ground surface G. Further, in the retracted position, the handrail 46 is generally vertically lower and generally further forward than the position of the handrail 46 in the deployed position.

In FIG. 4, the handrail 46 has moved from the retracted position of FIG. 5 such that the handrail assembly 32 is in the deployed position. In the deployed position, the handrail 46 is inclined relative to the housing 44. In particular, the handrail 46 is inclined at a non-zero angle relative to the housing, such that respective length dimensions of the housing 44 and handrail 46 extend in directions that are neither parallel nor perpendicular to one another. Further, the length dimension of the handrail 46 extends in a direction that is neither parallel nor perpendicular to the ground surface G. Further, a length of the handrail 46 is substantially parallel to an expected path of movement of a user entering or exiting the cargo area using the step assembly 28. In a particular example, the handrail 46 is substantially parallel to the first and second rails 40, 42.

The linkage assembly 48 facilitates movement of the handrail 46 relative to the housing 44 between the positions of FIGS. 4 and 5. In particular, the linkage assembly 48 is configured to cause the handrail 46 to move relative to the housing 44 in both a vertical direction and a direction perpendicular to the vertical direction (i.e., rearward) to move the handrail out of the retracted position and such that the handrail assembly 32 is in the deployed position. Specifically, the linkage assembly 48 permits the handrail 46 to essentially swing relative to the housing 44 by moving vertically and either forward or rearward, simultaneously.

In this example, a spring 64 is connected between the handrail 46 and the first link 50. The spring 64 may be configured to bias the handrail 46 to move out of the retracted position when the handrail assembly 32 is in the intermediate position. The spring 64 is not present in all examples. When present, the spring 64 may be tuned to prevent undue downward movement of the handrail 46 when moving from the deployed position to the retracted position.

The handrail assembly 32 further includes a lock assembly 66 (FIGS. 6 and 7) configured to selectively hold the handrail assembly 32 in a deployed position, unless and until the lock assembly 66 is actuated, which releases the lock assembly 66 and permits movement of the handrail assembly 32 out of the deployed position (i.e., back to the intermediate position, and ultimately back to the stowed position).

Figure 6:
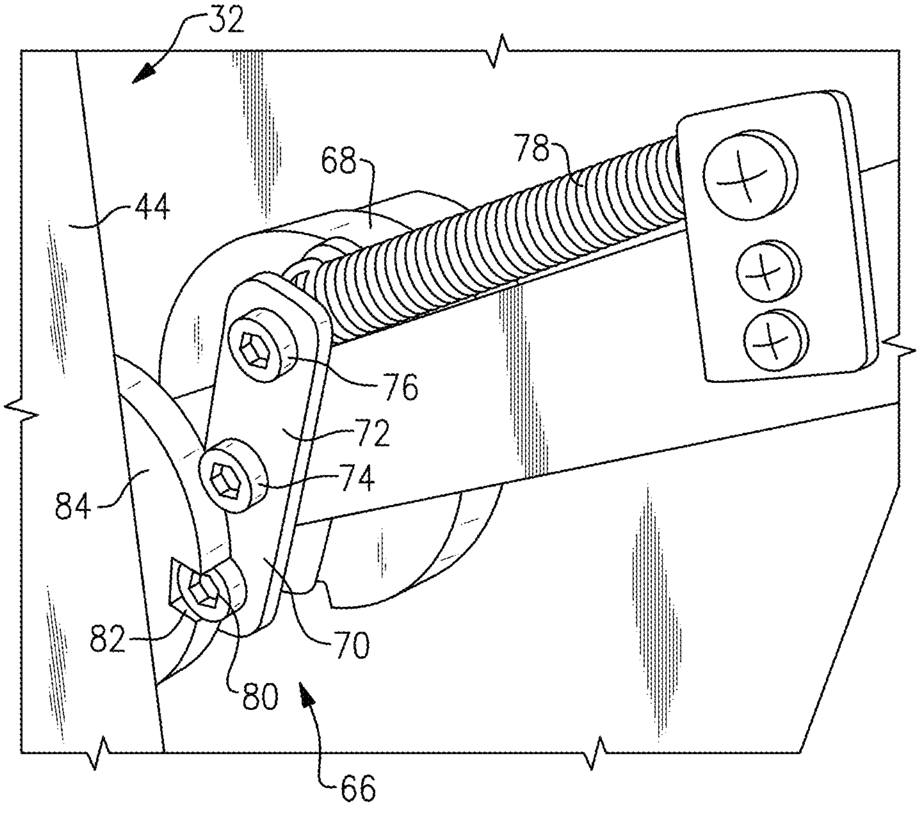
FIG. 6 is a close-up view of some components of a first example lock assembly.
Figure 7:
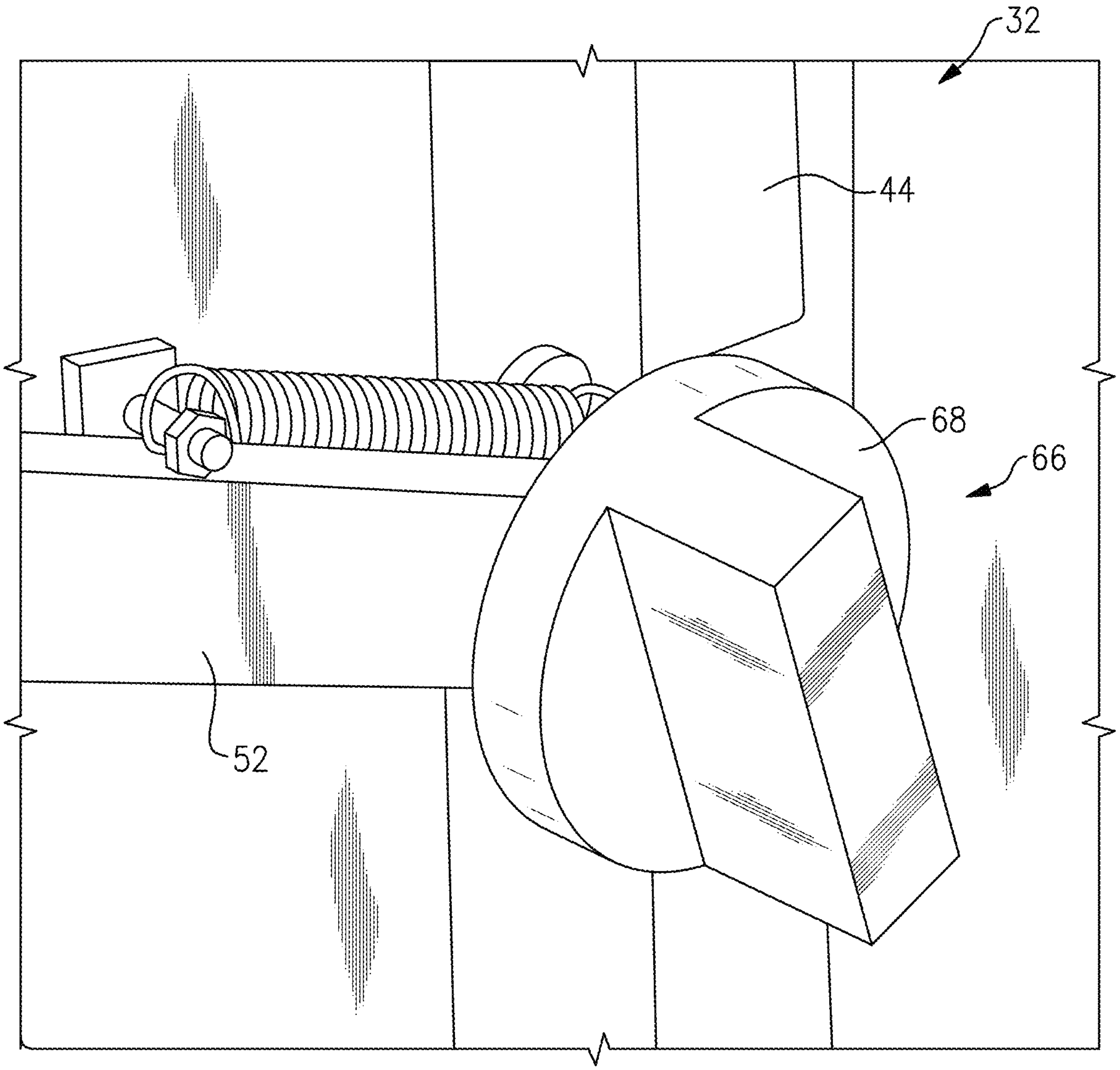
FIG. 7 is another view of the first example lock assembly.

A first example lock assembly 66 is shown in FIGS. 6 and 7. In this example, the lock assembly 66 includes a knob 68 and a latch 70. The knob 68 is rotatably mounted to the second link 52, in this example. The latch 70 includes a plate 72 including a first pin 74 about which the knob 68 and plate 72 are configured to rotate. A second pin 76 is adjacent a vertically upper end of the plate 72, in this example, and is attached to a spring 78. The spring 78 is mounted to the second link 52 and is spaced-apart from the latch 70 in a direction opposite the housing 44. The plate 72 further includes a third pin 80 on an opposite side of the first pin 74 as the second pin 76, which in this example is a vertically lower side of the plate 72. The third pin 80 is configured to be received in a slot 82 formed in a projection 84. The projection 84 is rigidly attached to the housing 44 in this example. The projection 84 could be attached to, or provided by, bracket 54, in other examples.

As the handrail 46 moves from the retracted position and the handrail assembly 32 enters the deployed position, the third pin 80 enters the slot 82. The spring 78 biases the plate 72 and knob 68 such that the third pin 80 is biased into the slot 82. Engagement between the third pin 80 and slot 82 prevents movement of the handrail 46 when the handrail assembly 32 is in the deployed position. To move the handrail assembly 32 out of the deployed position, and specifically to move the handrail 46 toward the retracted position, the knob 68 is rotated in a counter-clockwise direction, relative to FIG. 6, to overcome the bias of the spring 78 and to bring the third pin 80 out of the slot 82. With the third pin 80 out of the slot 82, the handrail assembly 32 can be moved out of the deployed position, and in particular the handrail 46 can be moved toward the retracted position.

While the lock assembly 66 includes only one slot 82, there could be a second slot formed in the projection 84 corresponding to the retracted position of the handrail 46. In this way, the third pin 80 can enter the second slot and selectively lock the handrail 46 in the retracted position. In that example, the knob 68 can be rotated to selectively release the third pin 80 from the second slot, permitting movement of the handrail 46 out of the retracted position.

Figure 8:
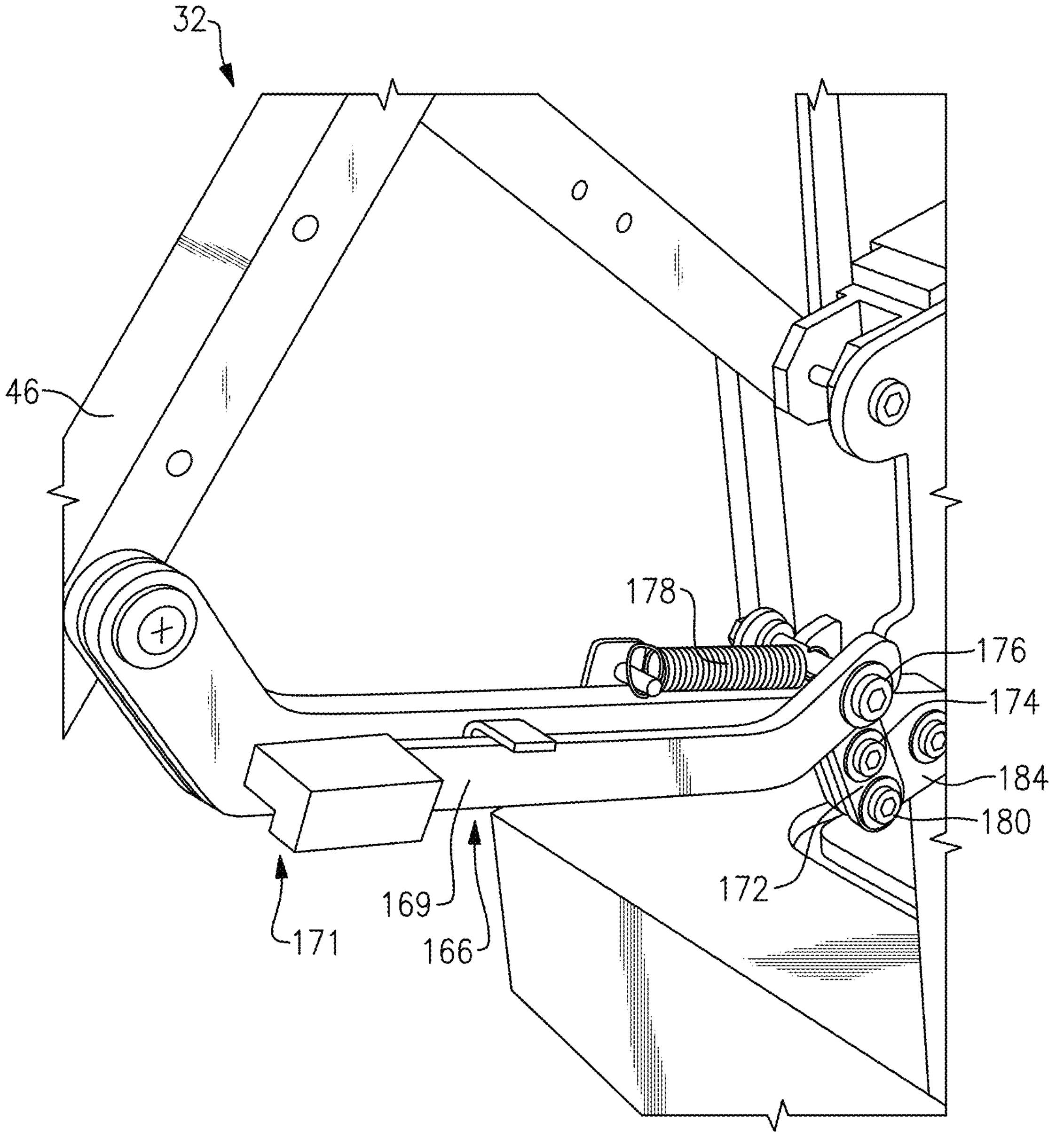
FIG. 8 is a view of some components of a second example lock assembly.
Figure 9:
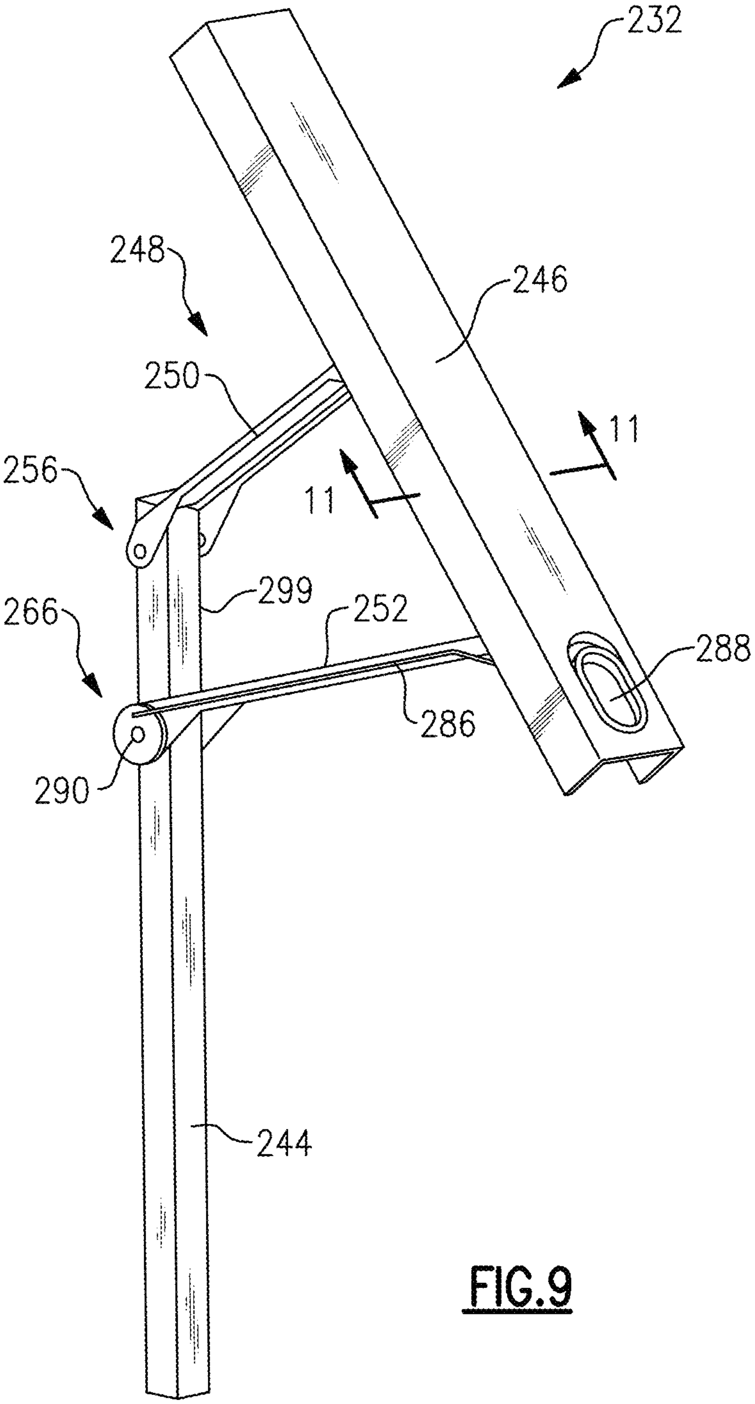
FIG. 9 is a side perspective view of another example handrail assembly in a deployed position.
Figure 10:
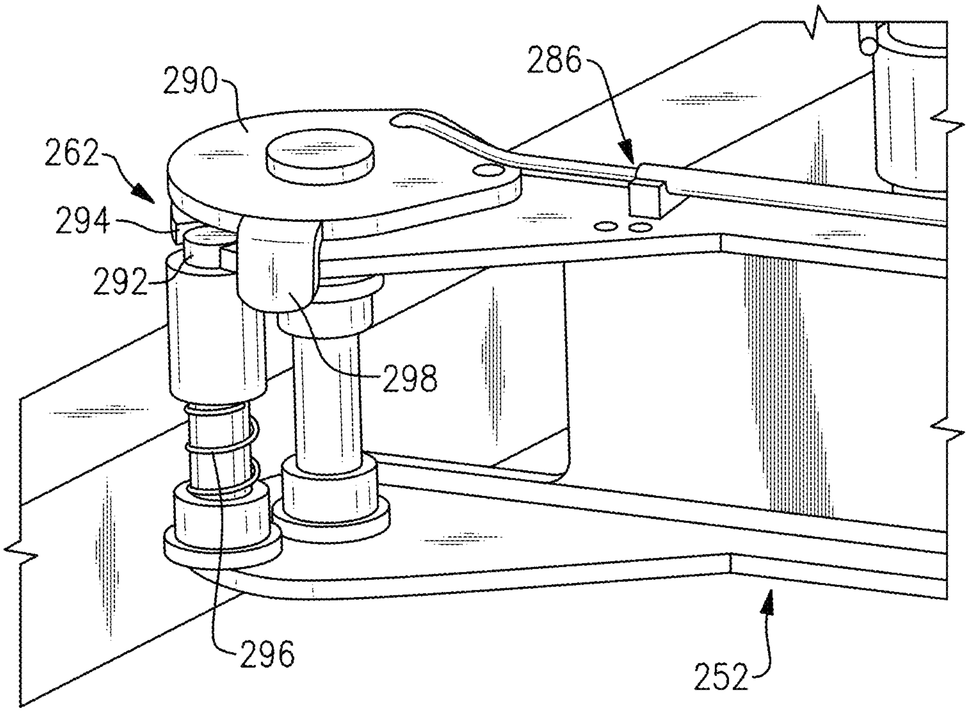
FIG. 10 is a view of some components of a third example lock assembly.

FIG. 8 illustrates another example lock assembly 166. The lock assembly 166 is configured similar to lock assembly 66, with like structures having like reference numbers preappended with a "1." Instead of a knob 68, the lock assembly 166 includes a push-rod 169. The push-rod 169 is connected to the second pin 176. The push-rod 169 includes an actuating end 171 adjacent the handrail 46. A user overcomes the bias of the spring 178 by applying force to the actuating end 171, causing the third pin 180 to rotate out of engagement of the slot 182 (not shown). As with the above example, the lock assembly 166 could have a second slot in addition to slot 182, with the second slot configured to receive the third pin 180 when the handrail 46 is in the retracted position.

FIGS. 9-13 illustrate another example handrail assembly 232, which is similar to the handrail assembly 32, with like structures having reference numbers preappended with a "2."

A first difference between the handrail assembly 232 and the handrail assembly 32 is with respect to the lock assembly 266. The lock assembly 266 includes a push-pull cable 286, such as a Bowden cable, routed along the second link 252 and coupled to a slider 288 mounted in a face of the handrail 246. The slider 288 can be recessed below a surface of the handrail 246. Opposite the slider 288, the push-pull cable 286 is coupled to a cam 290. In this example, a pin 292 partially projects out of the housing 244 (not shown in FIG. 10) and into engagement with a slot 294 formed adjacent the second end 260 of the second link 252. The pin 292 is biased outwardly, toward the slot 294, by a spring 296. As with the above-discussed lock assemblies, the lock assembly 266 is configured to hold the handrail assembly 232 in the deployed position.

In order to move the handrail assembly 232 out of the deployed position, a user slides the slider 288 such that the push-pull cable 286 pulls on the cam 290, rotating the cam 290 such that tab 298 attached to the cam 290 comes into engagement with the pin 292 and moves the pin 292 inwardly relative to the housing 244, against the bias of the spring 296, and such that the pin 292 is no longer within slot 294. With the pin 292 removed from the slot 294, the handrail 246 can be moved toward the retracted position.

While the lock assembly 266 includes only one slot 294, there could be a second slot formed in the second link 252 corresponding to the retracted position of the handrail 246. In this way, the pin 292 can enter the second slot and selectively lock the handrail 246 in the retracted position.

Another aspect of the handrail assembly 232 is the spring 299 provided between the first link 250 and the housing 244 adjacent the first end 256 of the first link 250. The spring 299 is a torsion spring in this example. The spring 299 is configured to assist a user in raising the handrail 246 from the retracted position to the deployed position, and to resist undue downward movement of the handrail 246 when moving from the deployed position to the retracted position. In another embodiment, the spring 299 could be tuned so as to be able to complete the movement of the handrail 246 from the retracted position to the deployed position without intervention of the user. In other examples, the spring 299 could be replaced with a strut, such as a gas-assist strut. The spring 299 could be used in combination with one or more dampers. The spring 299 could also be a constant force spring. A spring similar to spring 299 could be used in combination with the handrail assembly 32.

Figure 12:
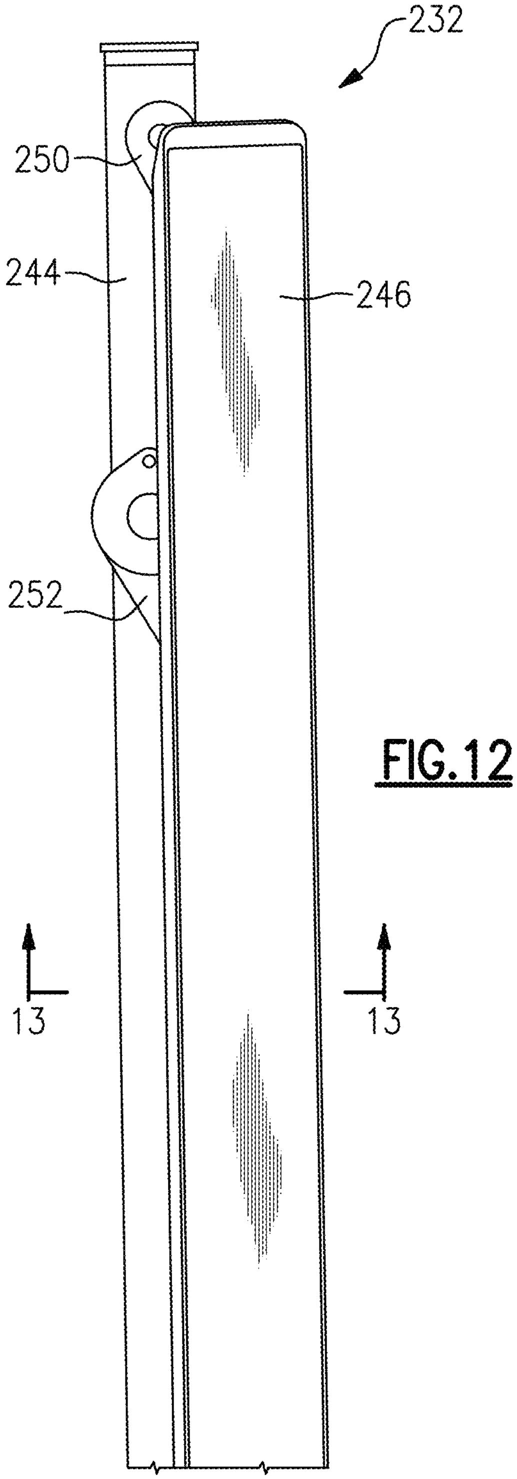
FIG. 12 is a view of the handrail assembly of FIG. 9 in an intermediate position.
Figure 11:
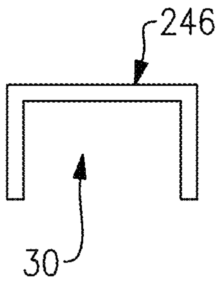
FIG. 11 is a cross-sectional view of the handrail taken along line 11-11 from FIG. 9.
Figure 13:
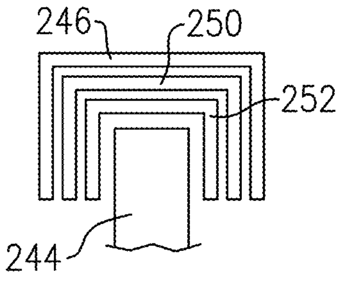
FIG. 13 is a cross-sectional view of the handrail assembly taken along line 13-13 from FIG. 12, illustrating a nesting relationship between various components of the handrail assembly.

Another aspect of the handrail assembly 232 relates to a configuration that facilitates nesting of the handrail assembly 232. As shown in FIG. 11, the handrail 246 resembles a substantial upside-down U shape in cross-section, with a concave surface 300 facing the housing 244. In an example, the first and second links 250, 252 include a similar cross-sectional shape. In this way, when in the retracted position of FIG. 12, the first link 250 can be partially nestable within the handrail 246, the second link is partially nestable within the first link 250 and the handrail 246, and the housing 244 is partially nestable within the second link 252, the first link 250, and the handrail 246, as shown in FIG. 13. This provides a compact arrangement of the handrail assembly 232 when in the retracted position, as represented in FIG. 12. The compact arrangement in the retracted position increases the ease of storing the handrail assembly 232 within the inner cavity 30 of the tailgate 20. In this regard, the handrails 46, 246 are in the retracted position relative to the housing 44, 244 when the handrail assemblies 32, 232 are in the stowed and intermediate positions.

It should be understood that directional terms such as "bottom," "top," "forward," "rearward," "upward," "downward," etc., are used for purposes of explanation only and should not be deemed limiting. Further, it should be understood that terms such as "about," "substantially," and "generally" are not intended to be boundaryless terms, and should be interpreted consistent with the way one skilled in the art would interpret those terms. It should be understood that certain aspects of the disclosure are exaggerated in the Figures for purposes of illustration only.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:

a tailgate; and a handrail assembly moveable relative to the tailgate between a stowed position and a deployed position, wherein the handrail assembly includes a housing and a handrail attached to the housing, wherein, when the handrail assembly is in the deployed position, the handrail is inclined relative to the housing such that a length dimension of the handrail is neither parallel nor perpendicular to a length dimension of the housing.

2. The motor vehicle as recited in claim 1, wherein:

the handrail assembly includes a linkage assembly, and the handrail is moveably connected to the housing via the linkage assembly.

3. A motor vehicle, comprising:

a tailgate; and a handrail assembly moveable relative to the tailgate between a stowed position and a deployed position, wherein the handrail assembly includes a housing and a handrail attached to the housing, wherein, when the handrail assembly is in the deployed position, the handrail is inclined relative to the housing, wherein the handrail assembly includes a linkage assembly, wherein the handrail is moveably connected to the housing via the linkage assembly, wherein the handrail assembly is moveable from the stowed position to an intermediate position in which the housing and handrail have been rotated relative to the stowed position, and in which the handrail is in a retracted position relative to the housing, and wherein the linkage assembly is configured to cause the handrail to move relative to the housing in a vertical direction and a direction perpendicular to the vertical direction, simultaneously, to move the handrail out of the retracted position and such that the handrail assembly is in the deployed position.

4. The motor vehicle as recited in claim 3, wherein:

when the handrail assembly is in the intermediate position, the handrail is substantially parallel to the housing, and when the handrail assembly is in the deployed position, the handrail is non-parallel and non-perpendicular relative to the housing.

5. The motor vehicle as recited in claim 3, further comprising a lock assembly configured to selectively hold the handrail assembly in the deployed position unless actuated.

6. The motor vehicle as recited in claim 5, wherein:

the lock assembly includes a push-rod and a latch, the lock assembly is configured such that the push-rod is biased by a spring such that a portion of the latch is within a slot when the handrail assembly is in the deployed position, and the lock assembly is configured such that sliding of the push-rod overcoming the bias of the spring brings the latch out of the slot such that the handrail can be moved relative to the housing to the retracted position.

7. The motor vehicle as recited in claim 5, wherein:

the lock assembly includes a knob coupled to a latch, the lock assembly is configured such that the knob is biased by a spring such that a portion of the latch is within a slot when the handrail assembly is in the deployed position, and the lock assembly is configured such that rotation of the knob overcoming the bias of the spring brings the latch out of the slot such that the handrail can be moved relative to the housing to the retracted position.

8. The motor vehicle as recited in claim 5, wherein:

the lock assembly includes a push-pull cable coupled to a slider mounted in the handrail, the lock assembly further includes a cam coupled to the push-pull cable on an opposite side of the slider, the lock assembly includes a pin configured to selectively hold the linkage assembly in place when the handrail assembly is in the deployed position, and the cam is selectively rotatable into engagement with the pin to cause the pin to disengage the linkage assembly such that the handrail can be moved relative to the housing to the retracted position.

9. The motor vehicle as recited in claim 3, wherein the handrail is in the retracted position relative to the housing when the handrail assembly is in the stowed and intermediate positions.

10. The motor vehicle as recited in claim 3, wherein the linkage assembly is configured to cause the handrail to move vertically upward and rearward when moving from the retracted position to the deployed position of the handrail assembly.

11. The motor vehicle as recited in claim 2, wherein:

the linkage assembly includes a first link and a second link, the first link is pivotably joined to the housing adjacent a first end thereof and is pivotably joined to the handrail adjacent a second end thereof opposite the first end of the first link, and the second link is pivotably joined to the housing adjacent a first end thereof and is pivotably joined to the handrail adjacent a second end thereof opposite the first end of the second link.

12. The motor vehicle as recited in claim 11, wherein:

the first end of the first link is spaced-apart from the first end of the second link along a length of the housing, and the second end of the first link is spaced-apart from the second end of the second link along a length of the handrail.

13. The motor vehicle as recited in claim 1, wherein the handrail includes a concave surface facing the housing.

14. The motor vehicle as recited in claim 13, wherein at least a portion of the housing is nested within the handrail when the handrail is in a retracted position.

15. The motor vehicle as recited in claim 1, wherein, when the handrail assembly is in the stowed position, the handrail assembly is within an inner cavity of the tailgate.

16. The motor vehicle as recited in claim 1, further comprising:

a step assembly movable between a stowed position and a deployed position relative to an inner cavity of the tailgate, wherein the step assembly includes a first step pad and a second step pad, and wherein, when the step assembly is in the deployed position, the first step pad is spaced-apart vertically from the second step pad.

17. A method, comprising:

moving a handrail assembly relative to a tailgate of a motor vehicle between a stowed position and a deployed position, wherein the handrail assembly includes a housing and a handrail attached to the housing, wherein, when the handrail assembly is in the deployed position, the handrail is inclined relative to the housing such that a length dimension of the handrail is neither parallel nor perpendicular to a length dimension of the housing.

18. The method as recited in claim 17, wherein moving the handrail assembly includes:

moving the handrail assembly from the stowed position to an intermediate position in which the housing and handrail have been rotated relative to the stowed position, and in which the handrail is in a retracted position relative to the housing, moving the handrail relative to the housing by simultaneously moving the handrail relative to the housing in a vertical direction and in a direction perpendicular to the vertical direction to move the handrail out of the retracted position and such that the handrail assembly is in the deployed position.

19. The method as recited in claim 18, further comprising actuating a lock assembly before moving the handrail assembly from the deployed position.

20. The method as recited in claim 17, further comprising:

deploying a step assembly relative to the tailgate, wherein the step assembly includes a first step pad and a second step pad spaced-apart from the first step pad.

* * * * *